US009798722B2

(12) United States Patent
Michaelis (10) Patent No.: US 9,798,722 B2
(45) Date of Patent: Oct. 24, 2017

(54) SYSTEM AND METHOD FOR TRANSMITTING MULTIPLE TEXT STREAMS OF A COMMUNICATION IN DIFFERENT LANGUAGES

(71) Applicant: Avaya Inc., Basking Ridge, NJ (US)

(72) Inventor: Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 552 days.

(21) Appl. No.: 13/778,875

(22) Filed: Feb. 27, 2013

(65) Prior Publication Data

US 2014/0244235 A1   Aug. 28, 2014

(51) Int. Cl.
*G06F 17/28* (2006.01)
*H04L 12/18* (2006.01)

(52) U.S. Cl.
CPC ........ *G06F 17/289* (2013.01); *H04L 12/1827* (2013.01)

(58) Field of Classification Search
CPC ..... G06F 17/289; G06F 17/28; H04L 12/1827
USPC .......................................................... 704/2
See application file for complete search history.

(56) References Cited

U.S. PATENT DOCUMENTS

| | | | | |
|---|---|---|---|---|
| 5,675,817 A | * | 10/1997 | Moughanni | G08B 5/229 704/3 |
| 5,715,466 A | * | 2/1998 | Flanagan | G06F 17/289 704/2 |
| 5,835,670 A | * | 11/1998 | Hirayama | G09B 5/065 360/48 |
| 5,987,401 A | * | 11/1999 | Trudeau | H04L 12/1827 704/2 |
| 6,993,474 B2 | * | 1/2006 | Curry | G06F 17/289 345/171 |
| 7,031,906 B2 | * | 4/2006 | Shimohata | G06F 17/289 704/2 |
| 7,272,377 B2 | * | 9/2007 | Cox | H04M 3/42229 455/403 |

(Continued)

FOREIGN PATENT DOCUMENTS

| | | |
|---|---|---|
| EP | 744866 A2 * | 11/1996 |
| JP | 10173757 A * | 6/1998 |

OTHER PUBLICATIONS

Hellstrom, G., "RTP Payload for Text Conversation" Cysco Systems, Inc. Network Working Group. Jun. 2005. 19 pgs.

*Primary Examiner* — Edwin S Leland, III
(74) *Attorney, Agent, or Firm* — Sheridan Ross P.C.

(57) ABSTRACT

A communication, such as a voice communication, is established between a communication device and a media application. The media application may be, for example, a voice conferencing system or a media server. Some or all of the communication is translated into a plurality of text streams that are in different languages. The plurality of text streams are transmitted to the communication device along with the stream of the communication. The communication device receives the text streams in the different languages and the stream of the communication. A user of the communication device can select a language for displaying one or more of the text streams in the different languages. The text stream associated with the selected language is then displayed to the user in conjunction with the stream of the communication.

20 Claims, 5 Drawing Sheets

(56) References Cited

U.S. PATENT DOCUMENTS

| | | | | |
|---|---|---|---|---|
| 7,392,173 B2* | 6/2008 | Godoy | G06F 17/289 | 704/8 |
| 7,412,374 B1* | 8/2008 | Seiler | G06F 17/275 | 704/7 |
| 7,805,298 B2* | 9/2010 | Bennett | G06F 17/24 | 369/25.01 |
| 7,849,144 B2* | 12/2010 | Prajapat | G06F 17/289 | 704/231 |
| 7,970,598 B1* | 6/2011 | Flanagan | G06F 17/2827 | 704/2 |
| 8,050,665 B1* | 11/2011 | Orbach | H04M 19/04 | 340/539.1 |
| 8,566,075 B1* | 10/2013 | Bruner | H04N 21/234336 | 704/2 |
| 8,571,528 B1* | 10/2013 | Channakeshava | H04M 3/42221 | 379/201.01 |
| 8,611,928 B1* | 12/2013 | Bill | H04W 48/04 | 455/414.2 |
| 9,031,827 B2* | 5/2015 | Frankel | H04M 3/568 | 379/202.01 |
| 9,053,096 B2* | 6/2015 | Lord | G06F 17/289 | |
| 2001/0030710 A1* | 10/2001 | Werner | H04N 7/0885 | 348/467 |
| 2002/0126321 A1* | 9/2002 | Trachtman | H04N 1/32122 | 358/407 |
| 2002/0161579 A1* | 10/2002 | Saindon | G06F 17/28 | 704/235 |
| 2002/0186328 A1* | 12/2002 | Nishida | H04N 5/607 | 348/738 |
| 2004/0034522 A1* | 2/2004 | Liebermann | G06F 17/2872 | 704/2 |
| 2004/0096050 A1* | 5/2004 | Das | H04M 3/5233 | 379/265.12 |
| 2004/0143430 A1* | 7/2004 | Said | G06F 17/218 | 704/2 |
| 2005/0267738 A1* | 12/2005 | Wilkinson | G06F 17/275 | 704/9 |
| 2006/0149558 A1* | 7/2006 | Kahn | G10L 15/063 | 704/278 |
| 2007/0156811 A1* | 7/2007 | Jain | H04L 51/04 | 709/204 |
| 2009/0006076 A1* | 1/2009 | Jindal | G06F 17/289 | 704/3 |
| 2009/0144048 A1* | 6/2009 | Dvorin | G06F 17/289 | 704/3 |
| 2010/0106482 A1* | 4/2010 | Hardacker | G06F 17/289 | 704/3 |
| 2010/0118189 A1* | 5/2010 | Ayoub | G06F 17/289 | 348/468 |
| 2011/0191097 A1* | 8/2011 | Spears | G06F 17/28 | 704/9 |
| 2011/0219136 A1* | 9/2011 | DeLuca | G06F 15/16 | 709/231 |
| 2011/0231180 A1* | 9/2011 | Padi | G06F 17/289 | 704/3 |
| 2012/0044365 A1* | 2/2012 | Shuster | G02B 27/017 | 348/207.1 |
| 2013/0090915 A1* | 4/2013 | Clark | G06F 17/28 | 704/2 |
| 2013/0138422 A1* | 5/2013 | Daye | G10L 15/005 | 704/8 |
| 2013/0144603 A1* | 6/2013 | Lord | H04L 12/1831 | 704/9 |
| 2014/0016513 A1* | 1/2014 | Garcia Martin | H04L 51/38 | 370/259 |
| 2014/0046661 A1* | 2/2014 | Bruner | H04N 21/4884 | 704/235 |
| 2015/0154183 A1* | 6/2015 | Kristjansson | G06F 17/289 | 704/3 |
| 2016/0098395 A1* | 4/2016 | DuBose | G06F 17/289 | 704/2 |

* cited by examiner

SYSTEM AND METHOD FOR TRANSMITTING MULTIPLE TEXT STREAMS OF A COMMUNICATION IN DIFFERENT LANGUAGES

TECHNICAL FIELD

The systems and methods that relate to electronic communications and in particular to transmitting multiple streams of an electronic communication in different languages.

BACKGROUND

In today's world, the need to support multiple languages simultaneously is becoming increasingly important to manufactures of communications equipment and to providers of telecommunication services. This becomes evident in teleconferences and video conferences in which some participants have limited fluency in the primary language of the conference. For example, in a teleconference in which the language being spoken is English, there may be participants who have limited fluency in English whose primary language is German, and other participants who have limited fluency in English whose primary language is Spanish. In addition, there may be participants who are deaf or hearing-impaired. Other problems can include participants who have a heavy accent that may be difficult for other participants to understand.

These problems can result in poor communication between participants involved in the teleconference because of the language barriers. Poor communication results in lost time, business opportunities, and revenue. What is needed is a better way to provide services that aid the ability for these types of participants to communicate properly.

SUMMARY

Systems and methods are provided to solve these and other problems and disadvantages of the prior art. A communication, such as a voice communication, is established between a communication device and a media application. The media application may be, for example, a voice conferencing system or a media server. Some or all of the communication is translated into a plurality of text streams that are in different languages. The plurality of text streams are transmitted to the communication device along with the stream of the communication. The communication device receives the text streams in the different languages and the stream of the communication. A user of the communication device can select a language for displaying one or more of the text streams in the different languages. The text stream associated with the selected language is then displayed to the user in conjunction with the stream of the communication.

In an embodiment, the text streams in different languages are sent in a combined packet that is in a defined order or in a combined packet with a language identifier field. In an embodiment, the text streams are sent as separate packet streams where each packet has a language identifier field.

DETAILED DESCRIPTION

Figure 1:
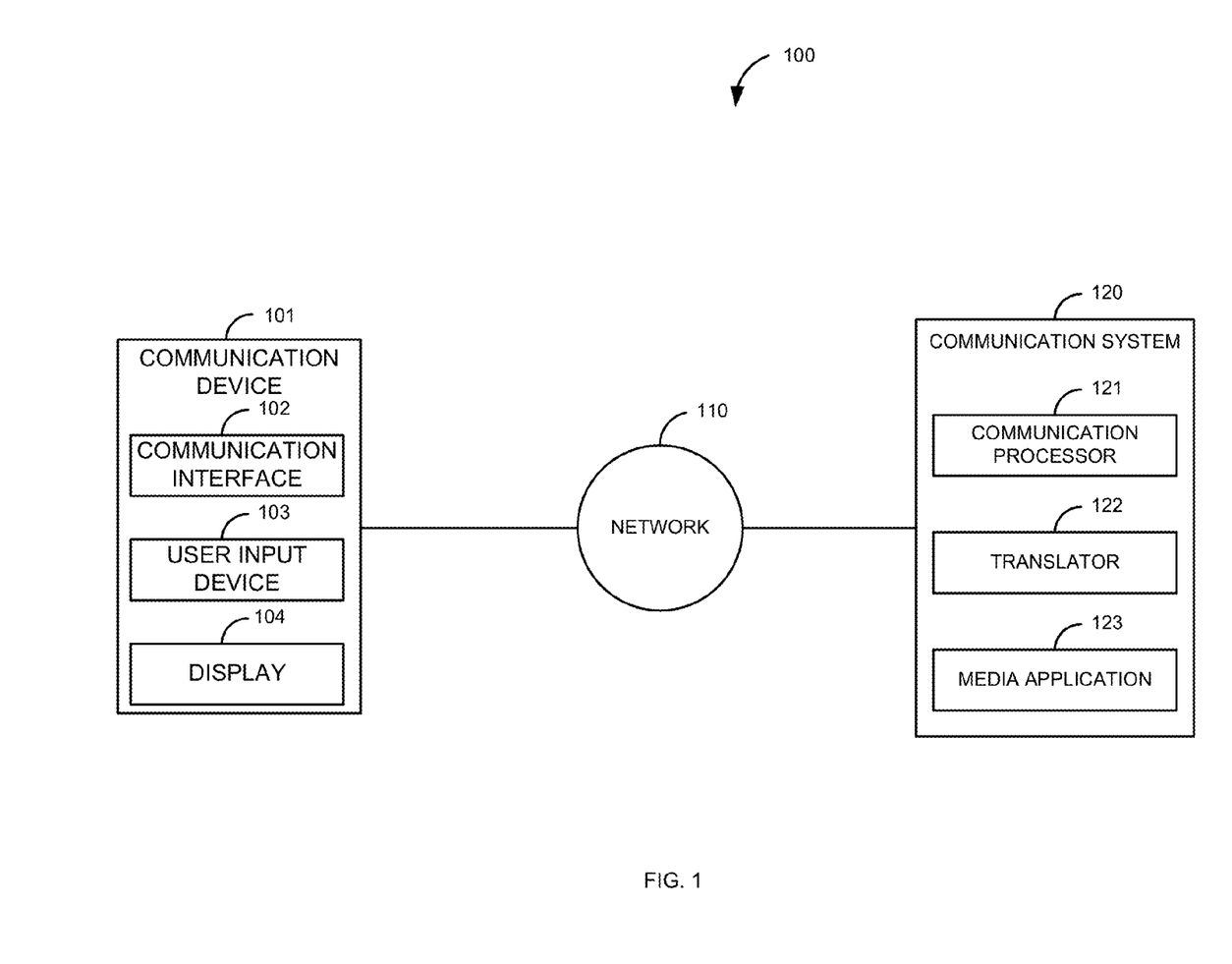
FIG. 1 is a block diagram of a first illustrative system for transmitting multiple text streams in different languages.

FIG. 1 is a block diagram of a first illustrative system 100 for transmitting multiple text streams in different languages. The first illustrative system 100 comprises a communication device 101, a network 110, and a communication system 120.

The communication device 101 may be any device that can communicate on the network 110, such as a Personal Computer (PC), a telephone, a video system, a cellular telephone, a Personal Digital Assistant (PDA), a tablet device, a notebook device, a combination of these, and the like. The communication device 101 can communicate with the communication system 120 via the network 110. In addition, the communication device 101 may be directly connected to the communication system 120.

The communication device 101 comprises a communication interface 102, a user input device 103, and a display 104. The communication interface 102 can be any hardware/software that can communicate with the network 110, such as a communication module, a digital signaling processor, a communications processing software, a network interface, a combination of these, and the like. The communication interface 102 can communicate with the network 110 using a variety of protocols, such as Session Initiation Protocol (SIP), Ethernet, TCP/IP, UDP, H.323, WebRTC, video protocols, text protocols, Integrated Services Digital Network (ISDN), a combination of these, the like.

The user input device 103 can be any hardware/software that allows a user to provide input to the communication device 101, such as a mouse, a touch screen (e.g., display 104), a voice recognition system, a keyboard, a trackball, a video camera, a stylus, a combination of these, and the like. The display 104 can be any display that can present information to a user, such as a liquid crystal display, a plasma display, a cathode ray tube, a television, a light emitting diode display, a combination of these, and the like.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), and the like.

The communication system 120 can be any hardware/software that can process communications, such as a Private Branch Exchange (PBX), a communication switch, a server, a video switch, a video server, a central office switch, an application server, a router, a hub, the communication device 101, and/or the like. The communication system 120 comprises a communication processor 121, a translator 122, and a media application 123. The communication processor 121 can be any hardware/software that can process communications from the communication device 101, such as a digital signaling processor, a microprocessor, a protocol stack, a proxy server, a Back-to-Back User agent (B2BUA), a combination of these, and the like.

The translator 122 can be any hardware/software or person that can translate a text or voice signal to another language or dialect. In discussing translation of languages, translation of a language also comprises translation of various dialects. The translator 122 may translate a voice signal in one language to a text stream in a different language(s) or the same language. The translator 122 may translate a text stream or message in one language to other language(s). The media application 123 can be any application that uses media, such as a video bridge, a conference bridge, an Interactive Voice Response (IVR) system, a reverse 911 system, an Instant Message (IM) system, a voice application, a telephone system, a text messaging system, an email system, a telephone application in the communication device 101, a combination of these, and the like.

A communication is established via the communication processor 121 between the communication interface 102 in the communication device 101 and the media application 123. A communication can be established by receiving or initiating a communication. The communication can be initiated by the communication interface 102 or from the media application 123. The communication can be a voice communication, a video communication, a text communication, a combination of these, and the like.

The translator 122 translates at least a portion of the communication into a plurality of text streams in different languages. The translated portion of the communication can be any part of the communication. For example, the translated portion of the communication may only be a portion of the communication sent from the communication device 101, only the portion of the communication sent from the media application 123, all the communication, and the like.

The portion of the communication may only be a portion of the communication sent from the communication device 101 that is from a specific user. For example, if multiple participants are engaged in a conference call from the communication device 101, the portion of the communication that is translated may be only from a specific user talking on the communication device 101. The other user's voice signals on the communication device' 101 are not translated.

In another embodiment, the portion of communication may only be the audio stream from a specific communication device 101. In still other embodiments, the translated portion of the communication may not include specific words in an audio stream. For example, if the word is not known in the translated language. Alternatively, specific words may be filtered from the translation based on a defined user list. In addition, specific words may be filtered from translation for a specific user. For example, Fred is on a conference call with Joe. Joe constantly uses the word "uh." Fred decides that he does not want to see the Spanish translation of the word "uh" on his display because Fred says it so frequently. Fred defines in his user list that the word "uh" will not be translated and is filtered out when Joe says the word "uh." In another embodiment, pre-defined abbreviations may be substituted for long words or phrases, thereby conserving transmission bandwidth while also ensuring that users who have a limited number of characters available on the display of their device are not inconvenienced. Which portions of the communication that are translated, abbreviated, or substituted may be defined in a user or administrator defined profile.

The communication processor 121 transmits the plurality of text streams in the different languages to the communication device 101. The corresponding audio portion or text portion of the communication (i.e., a stream) may also be transmitted in conjunction with transmitting the plurality of text streams. The communication interface 102 receives the plurality of translated text streams in the different languages and the audio or text portion of the communication. The user input device 103 receives a selection of a language of one of the plurality of text streams from a user. The selection may occur at any time. For example, the selection may occur any time before or during the communication. The user can, in one embodiment, select multiple languages to display. The display 104 displays the text stream(s) to the user that corresponds to the selected language along with the audio or text stream of the communication.

To illustrate consider the following examples. The user of the communication device 101 establishes a communication via the communication processor 121 with an audio stream server (the media application 123) to stream an English podcast. The user of the communication device 101 is only partially fluent in English, but is fluent in Spanish. To aid the user of the communication device 101, the user of the communication device 101 selects the language of Spanish via a touch screen display (both the user input device 103 and the display 104).

As the podcast begins, the translator 122 translates the English voice of the podcast in real-time into English, Spanish, and French text streams. The Communication processor 121 transmits the three text streams of the podcast to the communication device 101 along with the English audio portion of the podcast. The communication interface 102 of the communication device 101 receives the translated text streams. Since the user has selected Spanish, the text stream of Spanish is displayed in display 104 of the communication device 101 along with the audio English podcast (the English and French streams are also received by the communication device 101, but are not displayed).

In a second example, the media application 123 is an Instant Messaging (IM) server that is in communication with other IM users using English text. The user of the communication device 101 has preconfigured that French is the default language that will be displayed. The IM server establishes a text communication with the communication device 101. As the other IM users (on other communication devices 101) send text in English, the translator 122 translates the English text to Spanish and French text streams. The English, Spanish, and French text streams are sent by the communication processor 121 to the communication device 101. The communication interface 102 receives the three text streams. Based on the selection of French by the user, the French text stream is displayed in display 104 to the user. The French text stream can be shown in conjunction with the English text stream.

Figure 2:
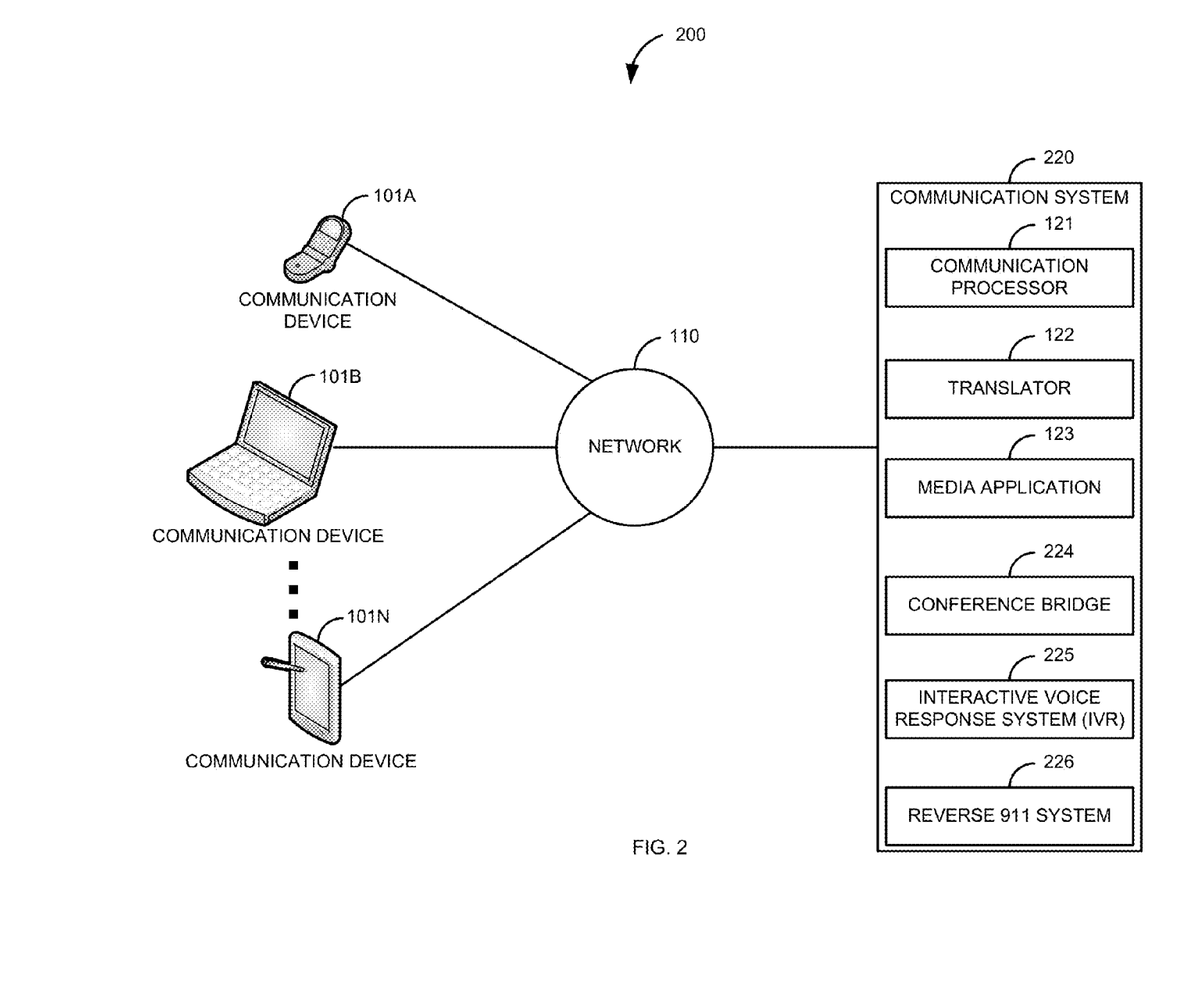
FIG. 2 is a block diagram of a second illustrative system for transmitting multiple text streams in different languages.

FIG. 2 is a block diagram of a second illustrative system 200 for transmitting multiple text streams in different languages. The second illustrative system 200 comprises communication devices 101A-101N, network 110, and communication system 220.

The communication devices 101A-101N are shown connected to the network 110. However, in some embodiments, all or some of the communication devices 101A-101N may be directly connected to the communication system 220. The communication devices 101A-101N may comprise all the same elements 102-104 as the communication device 101 in FIG. 1. Although three communication devices 101A-101N are shown in FIG. 2, any number of communication devices 101 may be connected to the network 110.

The communication system 220 comprises the communication processor 121, the translator 122, the media application 123, a conference bridge 224, an Interactive Voice Response (IVR) system 225, and a reverse 911 system 226. The conference bridge 224, the IVR system 225, and the reverse 911 system 226 are different examples of media applications 123.

The conference bridge 224 can be an audio bridge, a video bridge, a texting bridge, a mixer, a combination of these, and the like. The IVR system 225 can be any system that can provide a voice interaction with a user. The reverse 911 system 226 can be any system that can provide 911 (emergency) services by sending out voice, video, or text communications to users.

A communication (e.g., a voice or video conference) is established via the communication processor 121 between the communication devices 101A-101N and the conference bridge 224. The communication can be initiated by any of the communication devices 101A-101N, via the media application 123, via the conference bridge 224, via the IVR system 225, or via the reverse 911 system 226. In other embodiments, the media application 123 can be a voice mail menu, an auto-attendant, a music/voice on hold system, or any device that can support a live or recorded a language.

The translator 122 translates at least a portion of the communication (in this example a conference) into a plurality of text streams in different languages. Each of the communication devices 101A-101N receives the mixed audio stream of the other communication devices involved in the conference. The communication processor 121 transmits the plurality of text streams in the different languages to the communication devices 101A-101N. In this example, the translator 122 translates different text streams for each of the communication devices 101A-101N; this is because each communication device 101A-101N only receives the mixed voice streams of the other communication devices.

The communication interface 102 in each of the communication devices 101A-101N receives the plurality of translated text streams in the different languages from the communication processor 121. The user input device 103 in each of the communication devices 101A-101N receives a selection of a language of one of the plurality of text streams from a user. The display 104 in each of the communication devices 101A-101N displays the text stream(s) to the user that corresponds to the selected language(s). For example, a user of the communication device 101A may select to display an English text stream and the user of communication 101B may select to display a Japanese text stream while both are listening to the conference in Spanish.

To illustrate, consider the following examples. In one embodiment, the media application 123 is the IVR system 225. The user of the communication device 101A calls into the communication system 220 to establish a voice communication with the IVR system 225. The communication is established via the communication processor 121. The IVR system 225 presents to the user of the communication device 101A a series of voice menus. For example, the user may be presented with a voice menu that asks the user to select different services that the user may be interested in. The translator 122 translates the IVR voice menus into text streams in different languages. The text streams in different languages are transmitted to the communication device 101A along with the audio stream of voice menus. The communication interface 102 in the communication device 101A receives the text streams in different languages and the audio stream of the voice menus. Based on a language selection at the user input device 103 in the communication device 101A the selected language is displayed in the display 104 of the communication device 101A along with the audio stream of the voice menus.

In a another example, the reverse 911 system 226 initiates reverse 911 calls to the communication devices 101A-101N to warn users of the communication devices 101A-101N of a pending emergency, such as a tornado in their area. The audio portion of the warning is translated by the translator 122 into the different text streams in the different languages. The text streams in the different languages are then transmitted by the communication processor 121 to the communication devices 101A-101N. The communication devices 101A-101N receives the text streams in the different languages and displays the text streams of the selected languages on the communication devices 101A-101N.

In another embodiment, the text streams are not translated. Instead, the text streams are automatically generated based on an event. For example, the text can be automatically generated based on a flight being delayed. The system would generate the text streams in the different languages and send the text streams to anyone who has a ticket for that flight. The selected text stream would then be displayed on the user's communication device 101.

Figure 3A:
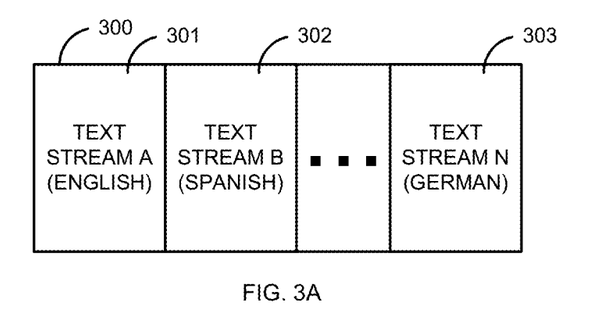
FIG. 3A is a diagram of a combined packet with text streams in different languages in a defined order.

FIG. 3A is a diagram of a combined packet 300 with text streams in different languages 301-303 in a defined order. As the communication is translated by the translator 122, into the different text streams in different languages 301-303, the different text streams in the different languages 301-303 are packetized into a series of packets that are transmitted by the communication processor 121 to the communication devices 101A-101N. The text streams in different languages 301-303 may be transmitted by the communication processor 121 in various ways. In one example, as shown in FIG. 3A, the text streams in different languages 301-303 are sent in the combined packet 300. The combined packet 300 comprises N number of text streams in different languages wherein N is a positive integer. In other words, the number of text streams can be anywhere from 1 to any number text streams in different languages. In this example, the combined packet 300 comprises text stream A 301, which is an English text stream, text stream B 302, which is a Spanish text stream, and text stream N 303, which is a German text stream.

The text streams 301-303 can be transmitted in a defined order and size. This way, when the communication interface 102 receives the combined packet 300, the communication interface 102 will know where each text stream in the combined packet 300 is located. The communication interface 102 of the communication devices 101A-101N receives the stream of combined packets 300 to produce the full text stream of the communication in the different languages. Individual ones of the text streams in different languages 301-303 can then be selected for display to the user.

The number of characters in each of the text streams in different languages 301-303, in the combined packet 300, typically all comprises the same number of characters. For example, the size of each of the text streams in different languages 301-303 may only be a single character. However, the number of characters in each of the text streams in the different languages 301-303 may vary. For example, a Chinese character typically represents a single word while the corresponding word in English may take multiple characters. Thus, the defined size (number of characters) of the English text stream 301 in combined packet 300 may be larger than a defined size of a Chinese text stream (not shown).

In another embodiment, the number of characters in each of the text streams in different languages 301-303 may all be the same number of characters. However, to compensate where one language uses less characters or more characters than another language, the communication processor 121 may transmit null or padding characters where less characters are needed.

The communication interface 102 of the communication device 101 may know the defined order of the text streams based on a pre-configuration or based on the communication processor 121 transmitting the defined order separately from the combined packet 300. By transmitting the defined order separately, the size and order of the text streams in the different languages can change dynamically. For example, if the communication system 120 is upgraded to support a new language, the communication system 120 can transmit a separate message indicating the order of the text streams that includes the newly supported language.

In one embodiment, the text streams in different languages 301-303, are separate packets that makeup the combined packet 300. In another embodiment, the separate packets that makeup the combined packet 300 are packets that are defined in accordance with RFC 4103 packet headers.

Figure 3B:
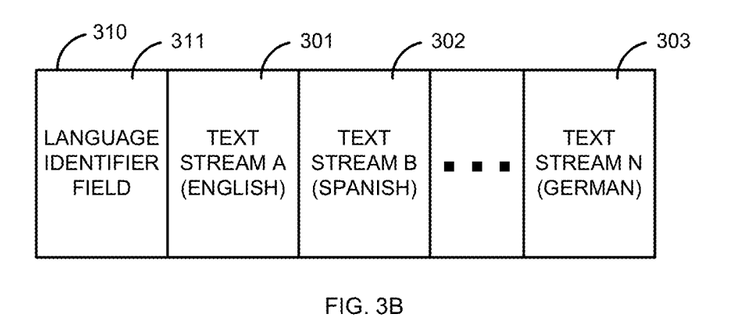
FIG. 3B is a diagram of a combined packet with a language identifier field.

FIG. 3B is a diagram of a combined packet 310 with a language identifier field 311. FIG. 3B is another example of how the text streams in different languages 301-303 can be transmitted by the communication processor 121 to the communication devices 101A-101N. The language identifier field 311 is used to identify how many languages (text streams) are in the combined packet 310 and the location of the individual text streams in the different languages 301-303.

The language identifier field 311 may comprise multiple fields. For example, the language identifier field 311 may contain a field that identifies the number of text streams in different languages 301-303, a field that identifies the location of each of the text streams in different languages, a field that identifies the number of characters in each of the text streams in different languages 301-303, a combination of these, and the like. Based on the information in the language identifier field 311, the communication interface 102 in the communication devices 101A-101N can determine where each of the individual text streams in different languages 301-303 are located.

In another embodiment, the stream of the communication may also be sent as part of the combined packet. The advantage to this method is that the information for each of the streams stays synchronized because they are included in the same packet.

Figure 3C:
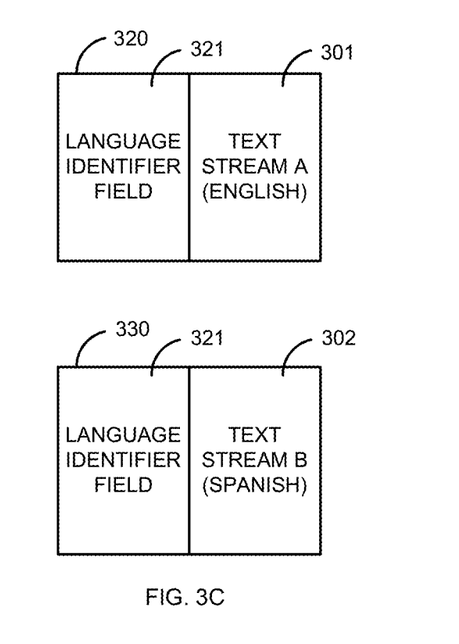
FIG. 3C is a diagram of packets of a plurality text streams that are transmitted individually using a language identifier field.

FIG. 3C is a diagram of packets (320 and 330) of a plurality text streams (301 and 302), that are transmitted individually using a language identifier field 321. In this example, only two packets (320 and 330) of two individual text streams (301 and 302) are shown. Although only two packets with two languages are shown, more than two languages can be supported by sending an additional packet stream separately from the other packet streams. The packets for each text stream (320 and 330) are generated and transmitted as separate packets by the communication processor 121 to the communication devices 101A-101N. The language identifier field 321 contains information on which language stream is in the payload of the packet (320 and 330). For example, the language identifier field may be a two bit field (or the language identifier field may have more bits of necessary) where 00 indicates the text stream is in English (packet 320), 01 indicates that the text stream is Spanish (packet 330), 10 indicates that the text stream is in German (not shown), and 11 indicates that the text stream is in French (not shown). In one embodiment, the language identifier field 321 is a new field in the standard RFC 4103 packet header.

The communication processor 121 transmits the individual text streams in different languages 301-302 as described in packets 320 and 330. The communication interface 102 in the communication devices 101A-101N receives the packets 320 and 330. Based on the language identifier field 321, the communication interface 102 knows which text stream the packet corresponds to. For example, if the communication interface 102 receives packet 320, based on the language identifier field 321 indicating English, the communication interface 102 will associate the packet with the English text stream.

In one embodiment, which can work with any of the processes described in FIGS. 3A-3C, one of the text streams (a sign language stream for the hearing impaired or deaf) may comprise a series of indicators that indicate a specific sign of a sign language that represents words or phrases spoken in the communication. The language identifier fields 311 and 321 will identify the sign language in the same way as described for vocal languages.

For example, if the word "house" is spoken in the communication, the translator 122 will translate the word "house" into a number that represents the word "house." The number is sent in the sign language text stream (instead of a translated character). The language stream is sent along with the text streams. The language stream is identified in the language identifier fields 311 and 321. If the user of the communication device 101 has selected the sign language, the communication device 101 looks up the number in the sign language text stream to identify a video clip that shows a sign representation of the word "house." The video clip that shows the sign language representation of the word "house" is displayed in the display 104 to the hearing impaired or deaf user.

The language identifier fields 311 and 321 may contain different identifiers that identify different sign languages being used. This way, the user of the communication device 101 can select between different types of sign languages to be displayed.

Although the above processes are described generally, the packets 300, 310, 320, and 330 may be transmitted using various standard, modified standard, or non standard protocols. For example, the packets 300, 310, 320, and 330 may be sent using TCP/IP, UDP, Session Initiation Protocol, H.323, WebRTC, video protocols, text protocols, circuit switched protocols, a combination of these, and the like. The packets 300, 310, 320, and 330 may be sent by modifying existing headers or by defining new headers within these existing protocols.

Figure 4:
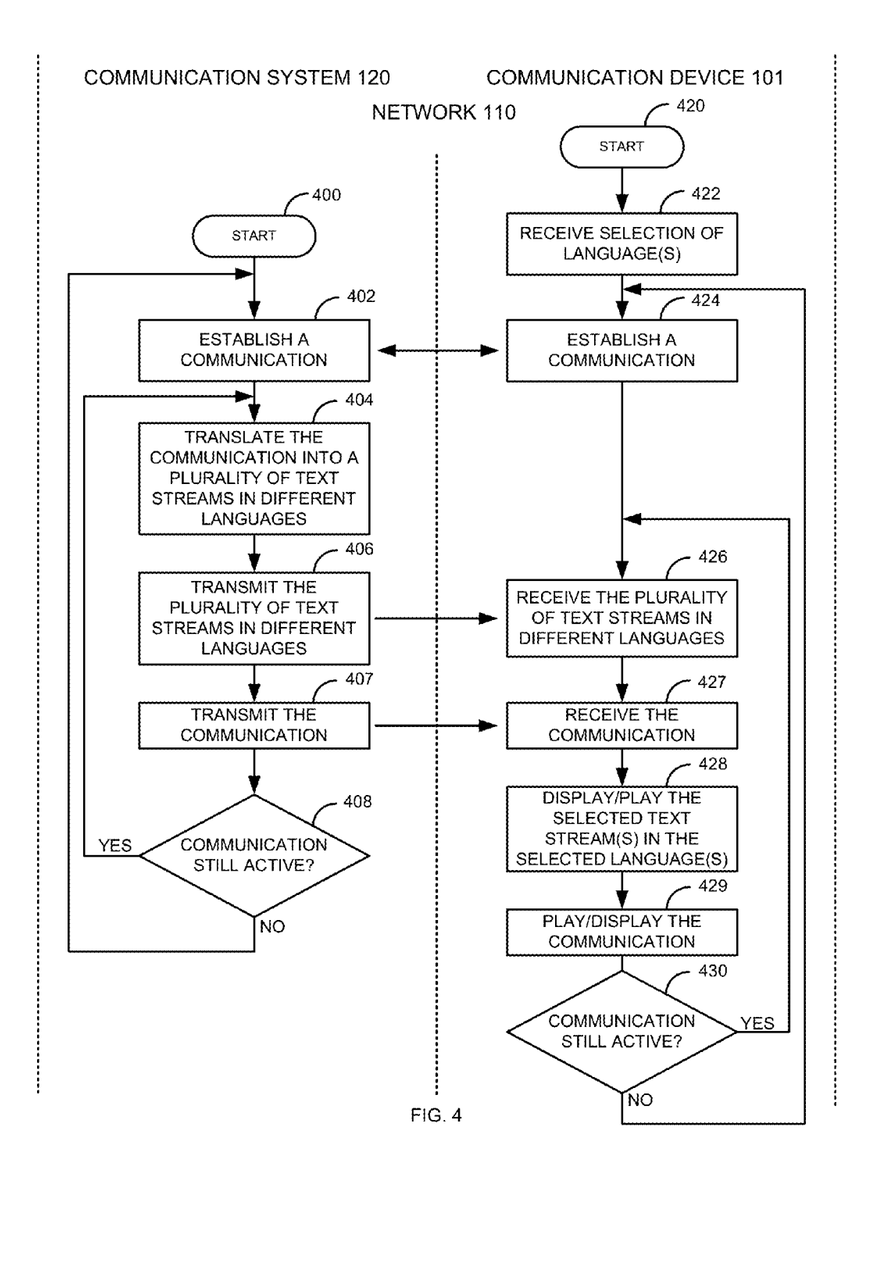
FIG. 4 is a flow diagram of a method for transmitting multiple text streams in different languages.
Figure 5:
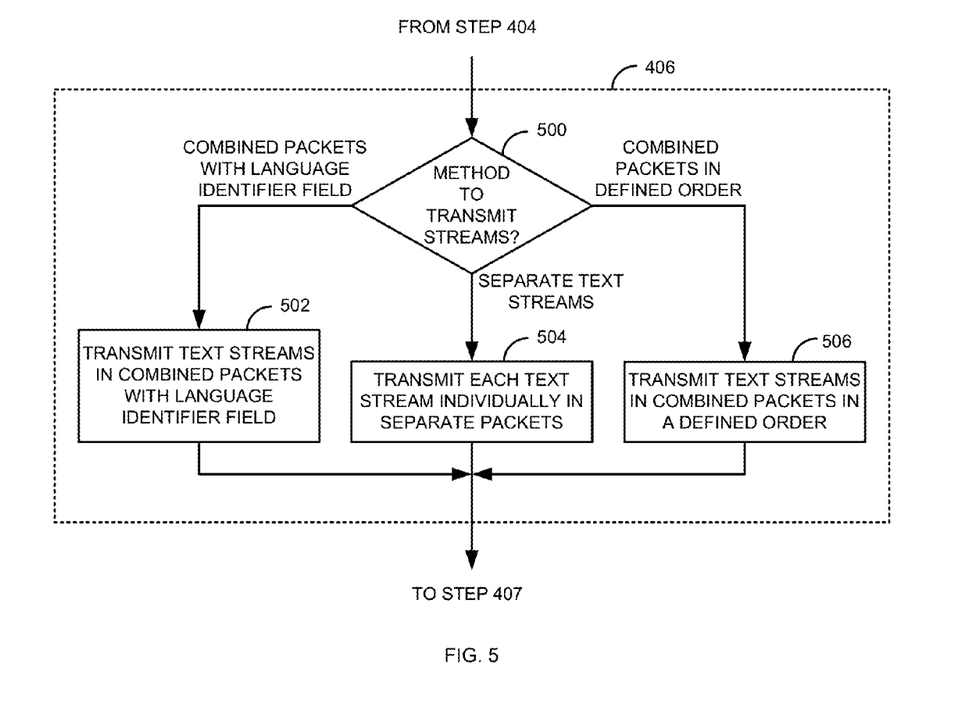
FIG. 5 is a flow diagram of different methods for transmitting multiple text streams in different languages.

FIG. 4 is a flow diagram of a method for transmitting multiple text streams in different languages. Illustratively, the communication devices 101A-101N, the communication systems 120 and 220, the communication processor 121, the translator 122, the media application 123, the conference bridge 224, the IVR system 225, the reverse 911 system 226, the communication interface 102, the user input device 103, and the display 104 are stored-program-controlled entities, such as a computer or processor, which perform the method of FIGS. 4-5 and the processes described herein by executing program instructions stored in a tangible computer readable storage medium, such as a memory or disk. Although the methods described in FIGS. 4-5 are shown in a specific order, one of skill in the art would recognize that the steps in FIGS. 4-5 may be implemented in different orders and/or be implemented in a multi-threaded environment. Moreover, various steps may be omitted or added based on implementation.

The process for the communication system 120 (may also be communication system 220) begins in step 400. The process for the communication device 101 begins in step 420. A user of the communication device 101 selects 422 a language(s) for displaying a text stream(s) of the communication. The selection in step 422 may also occur at any time during the communication or separately as a thread. For example, step 422 may occur after step 424.

A communication is established 402/424 between the communication device 101 and the communication system 120 via network 110. Establishment of the communication can be based on receiving or sending an initiation of the communication. The communication system 120 translates 404 the communication (or a portion of the communication) into a plurality of text streams in different languages. The communication system 120 transmits 406 the plurality of text streams in different languages via the network 110 to the communication device 101. The communication system 120 optionally transmits 407 the communication (or a portion of the communication) to the communication device 101. Step 407 is shown after steps 404 and 406. However, step 404 may occur before both steps 404 and 406. Likewise, step 427 may occur before step 426 based on step 407 occurring before step 406 or even based on delays in the network 110. In one embodiment, steps 426 and 427 are implemented in a separate receive thread.

The communication system 120 determines in step 408 if the communication is still active. If the communication is still active, the process goes to step 404 and continues to translate 404 the communication into the plurality of text streams. Otherwise, if the communication is not still active, the process goes to step 402 and waits for a new communication to be established.

The communication device 101 receives 426 the plurality of text streams in different languages. The communication device 101 can also receive 427 the communication (or the portion of the communication). The communication device 101 displays 428 the selected text stream(s) in the selected language(s). The communication device plays or displays 429 (depending if the communication is a voice, text, or video communication) the communication. In one embodiment, steps 428 and 429 may be reversed or occur simultaneously.

The communication device 101 determines in step 430 if the communication is still active. If the communication is still active in step 430, the process goes to step 426 to continue receive the plurality of text streams in different languages. Otherwise, if the communication is not still active in step 430, the process goes to step 424 to wait for a new communication to be established.

The above scenario can work in various embodiments. For example, the communication system 120 may comprise the IVR system 225. In another embodiment, the communication system 120 may comprise the conference bridge 224 where multiple communication devices are involved in a voice or video conference. In this example, on or all of the communication devices 101 involved in the conference can receive the plurality of text streams in different languages. Each of the communication devices 101 involved in the voice or video conference may be displaying the text of the voice or video conference in a different language. In yet another embodiment, the communication system 120 may actually be a communication device 101. In still another embodiment, the communication system 120 may comprise the reverse 911 system 226.

FIG. 5 is a flow diagram of different methods for transmitting multiple text streams in different languages. The method in FIG. 5 is an expanded view of step 406 in FIG. 4. After translating the communication into a plurality of text streams in different languages in step 404, the process determines in step 500 a method to transmit the text streams in different languages. If the process determines in step 500 to use the combined packet 310 with the language identifier field 311 (FIG. 3B), the communication system 120 transmits 502 the text streams using the combined packet 310 with the language identifier field 311. The process then goes to step 407.

The communication device 101 receives the combined packets 310. Based on the language identifier field 310, the communication device knows where each of the text streams in the packet are located in order to rebuild each of the text streams.

If the process determines in step 500 to use separate text streams (FIG. 3C), the process transmits 504 each text stream individually in separate packets (320 and 330). The separate packets include the language identifier field 321 for identifying the specific language of the packet stream. The different text streams may be sent simultaneously or at different time periods. The process then goes to step 407.

The communication device 101 receives the separate text streams from the communication system 120. As the packets are received, the communication device 101 identifies the language of each packet (based on language identifier field 320) and rebuilds the text stream for display to the user.

Otherwise, if the process determines in step 500 to use a combined packet 300 in the defined order (FIG. 3A), the process transmits the text streams in a combined packets in the defined order. The process then goes to step 407.

The communication device 101 receives the combined packet 300 in the defined order. The communication device 101, based on the defined order, rebuilds the text streams for display to the user.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method, comprising:
    establishing, by a processor, a communication, wherein the communication includes an audio communication from a first communication device;
    receiving, by the processor, an audio stream from the first communication device, wherein the audio stream comprises speech of a plurality of users of the first communication device;
    translating, by the processor, speech from the audio stream from the first communication device into a plurality of text streams, wherein the plurality of text streams are in different languages, and wherein each of the plurality of text streams in the different languages are directly translated from the audio stream from the first communication device;
filtering, by the processor, a specific translated word, in a specific language, from a specific user of the plurality of users, in a specific one of the plurality of text steams based on a user definable list; and
transmitting, by the processor, the plurality of text streams to at least one communication device involved in the communication.

2. The method of claim 1, wherein each of the plurality of text streams are transmitted individually as a plurality of separate packets, wherein each of the plurality of separate packets contains a corresponding language identifier field.

3. The method of claim 1, wherein each of the plurality of text streams are transmitted in a combined packet, wherein the combined packet contains a language identifier field to identify the different languages and locations of the plurality of text streams.

4. The method of claim 1, wherein the plurality of text streams are transmitted in a combined packet in a defined order.

5. The method of claim 4, wherein the defined order is sent to the at least one communication device in a message that is separate from the plurality of text streams.

6. The method of claim 4, wherein the combined packet contains a separate packet for each of the plurality of text streams.

7. The method of claim 1, wherein each of the plurality of text streams are transmitted as individual characters.

8. The method of claim 1, wherein the communication further comprises one of: a communication between a user and a voice mail menu, an auto-attendant, a music/voice on hold system, an Interactive Voice Response (IVR) system or a reverse 911 system.

9. The method of claim 1, wherein the communication is an audio or video conference call between a plurality of communication devices, wherein different ones of the plurality of communication devices receive different selections from different users of a plurality of communication devices, and wherein the different selections are to display different ones of the plurality of text streams.

10. The method of claim 1, wherein the at least one communication device can receive selections from a user to select a plurality of languages for display on the at least one communication device.

11. The method of claim 1, further comprising:
determining if the at least one communication device has a limited number of characters available for display; and
in response to determining that the at least one communication device has a limited number of characters available for display, substituting a pre-defined abbreviation for a long word or phrase in the plurality of audio streams.

12. A communication system, comprising:
a communication processor that establishes a communication, wherein the communication includes an audio communication with a plurality of communication devices, receives a plurality of audio streams from the plurality of communication devices, wherein the plurality of audio streams comprises speech of a plurality of users, and transmits a plurality of text streams to at least one communication device involved in the communication; and
a translator that translates speech from the plurality of audio streams from the plurality of communication devices into the plurality of text streams, wherein the plurality of text streams are in different languages, and filters a specific translated word, in a specific language, from a specific user of the plurality of users, in a specific one of the plurality of text steams based on a user definable list.

13. The communication system of claim 12, wherein each of the plurality of text streams are transmitted individually as a plurality of separate packets, wherein each of the plurality of separate packets contains a corresponding language identifier field.

14. The communication system of claim 12, wherein each of the plurality of text streams are transmitted in a combined packet, wherein the combined packet contains a language identifier field to identify the different languages and locations of the plurality of text streams.

15. The communication system of claim 12, wherein the plurality of text streams are transmitted in a combined packet in a defined order.

16. The communication system of claim 15, wherein the defined order is sent to the at least one communication device separately from the plurality of text streams or is preconfigured on the at least one communication device.

17. The communication system of claim 15, wherein the combined packet contains a separate packet for each of the plurality of text streams.

18. The communication system of claim 12, wherein the communication is an audio or video conference call between a plurality of communication devices, wherein different ones of the plurality of communication devices receive different selections from different users of a plurality of communication devices, and wherein the different selections are to display different ones of the plurality of text streams.

19. A method, comprising:
establishing, by a processor, a communication, wherein the communication includes an audio communication with a plurality of communication devices;
receiving, by the processor, a plurality of audio streams from the plurality of communication devices, wherein the plurality of audio streams comprises speech of a plurality of users;
translating, by the processor, speech from the plurality of audio streams from the plurality of communication devices into a plurality of text streams in a plurality of different languages;
filtering, by the processor, a specific translated word, in a specific language, from a specific user of the plurality of users, in a specific one of the plurality of text steams, based on a user definable list; and
transmitting, by the processor, the plurality of text streams to at least one communication device involved in the communication.

20. The method of claim 19, wherein each of the plurality of text streams are transmitted individually as a plurality of separate packets, wherein each of the plurality of separate packets contains a corresponding language identifier field.

* * * * *